United States Patent
Portolani et al.

(10) Patent No.: US 7,657,940 B2
(45) Date of Patent: Feb. 2, 2010

(54) SYSTEM FOR SSL RE-ENCRYPTION AFTER LOAD BALANCE

(75) Inventors: Maurizio Portolani, Milpitas, CA (US); Mauricio Arregoces, Rancho Palos Verdes, CA (US); David W. Chang, Milpitas, CA (US); Nagaraj A. Bagepalli, San Jose, CA (US); Stefano Testa, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 863 days.

(21) Appl. No.: 11/124,003

(22) Filed: May 6, 2005

(65) Prior Publication Data

US 2006/0095969 A1    May 4, 2006

Related U.S. Application Data

(60) Provisional application No. 60/623,810, filed on Oct. 28, 2004.

(51) Int. Cl.
| | |
|---|---|
| G06F 11/00 | (2006.01) |
| G06F 12/14 | (2006.01) |
| G06F 12/16 | (2006.01) |
| G08B 23/00 | (2006.01) |

(52) U.S. Cl. .............................. 726/23; 380/200
(58) Field of Classification Search .............. 709/227, 709/230; 713/151, 155, 189, 153, 150; 726/23; 380/200
See application file for complete search history.

(56) References Cited

U.S. PATENT DOCUMENTS

| | | | | |
|---|---|---|---|---|
| 5,774,670 | A  * | 6/1998 | Montulli | 709/227 |
| 6,411,986 | B1 | 6/2002 | Susai et al. | |
| 7,328,336 | B2 * | 2/2008 | Zsohar | 713/153 |
| 7,379,458 | B2 * | 5/2008 | Inoue et al. | 370/392 |
| 2003/0014624 | A1 * | 1/2003 | Maturana et al. | 713/151 |
| 2003/0014628 | A1 * | 1/2003 | Freed et al. | 713/155 |
| 2003/0014650 | A1 * | 1/2003 | Freed et al. | 713/189 |
| 2004/0210663 | A1 * | 10/2004 | Phillips et al. | 709/230 |
| 2004/0260921 | A1 * | 12/2004 | Treadwell | 713/150 |

OTHER PUBLICATIONS

Nachiketh R. Potlapally; Analyzing the energy consumption of security protocols; Year of Publication: 2003; Association for Computing Machinery; Year of Publication: 2003.*

* cited by examiner

*Primary Examiner*—Kambiz Zand
*Assistant Examiner*—Monjour Rahim
(74) *Attorney, Agent, or Firm*—Trellis IP Law Group, PC

(57) ABSTRACT

A data center provides secure handling of HTTPS traffic using backend SSL decryption and encryption in combination with a load balancer such as a content switch. The load balancer detects HTTPS traffic and redirects it to an SSL offloading device for decryption and return to the load balancer. The load balancer then uses the clear text traffic for load balancing purposes before it redirects the traffic back to the SSL offloading device for re-encryption. Thereafter, the re-encrypted traffic is sent to the destination servers in the data center. In one embodiment, the combination with the back-end SSL with an intrusion detection system improves security by performing intrusion detection on the decrypted HTTPS traffic.

23 Claims, 5 Drawing Sheets

SYSTEM FOR SSL RE-ENCRYPTION AFTER LOAD BALANCE

CROSS-REFERENCES TO RELATED APPLICATIONS

This application claims priority from commonly assigned provisional patent application entitled "Data Center Network Design And Infrastructure Architecture" by Mauricio Arregoces and Maurizio Portolani, Application No. 60/623,810, filed Oct. 28, 2004, the entire disclosure of which is herein incorporated by reference.

COPYRIGHT NOTICE

A portion of the disclosure recited in the specification contains material that is subject to copyright protection. Specifically, documents provided with this application include source code instructions for a process by which the present invention is practiced in a computer system. The copyright owner has no objection to the facsimile reproduction of the specification as filed in the Patent and Trademark Office. Otherwise, all copyright rights are reserved.

BACKGROUND OF THE INVENTION

Secure Sockets Layer or SSL is a protocol that was developed to securely transmit private messages between a client and a server via the internet or other public network. SSL is the industry-standard method of protecting web communication by using digitally data encryption and server and message authentication codes to maintain message integrity.

SSL connections typically have two phases. The first phase is the SSL session negotiation, which provides a mechanism for client and server authentication and negotiates encryption keys before data is exchanged. The second phase is the SSL application data transfer. In the second phase, SSL encrypts the data traffic to provide data confidentiality and integrity.

When an SSL session starts, client and server authenticate each other and agree on a secret key to be used encrypt the data transfer. This initial series of transactions are the most intensive operation in SSL processing and the most expensive operation in the handshake is the server-side RSA private key decryption of the client pre-master secret. Subsequent data is encrypted and authenticated with keys derived from the master key. A variety of cryptographic algorithms are supported by the SSL protocol. After the exchange of keys, a number of ciphers such as RC2, RC4, IDEA, DES, triple-DES may be used.

The SSL protocol usually operates in conjunction with an application layer protocol such as HTTPS. When a secure URL is found, that is the connection starts with https://, the client opens a TCP connection to port 443, followed by an SSL handshake and data transfer. SSL encrypts the HTTP header and the payload.

One problem with SSL arises because of the high CPU utilization required to perform all of the encryption operations during the SSL handshake. Of the encryption operations, the RSA encryption/decryption is the most expensive. Efficient handling of the encryption operations is particularly important in a data center where a cluster of servers configured for SSL traffic must be able to handle multiple client connections without degrading response to the client. For example, a server that can process ~9,000 HTTP (clear text) transactions per second at 100% CPU utilization can process only approximately one percent of the clear text transactions when processing HTTPS transactions. Thus, many servers are often dedicated to handle SSL traffic.

Another problem with SSL arises in data center operations handling SSL traffic. This traffic is distributed among a cluster of servers to share the load of incoming client requests and to provide high availability for the requested application. With load balancing, SSL traffic is sent to the load balancer first and then to a server, and the server undertakes the expensive task of decrypting the data. In other instances, the load balancer utilizes a network device, an SSL offloader, to handle the decryption before the load balancer performs the load distribution decision. The network device returns clear text (decrypted) traffic to the load balancer. Unfortunately, if the load balancer distributes clear text traffic to the server cluster, it can be easily monitored by a compromised server or by an attacker who has managed to connect a traffic monitoring device to the data center's VLAN or sub-net.

Yet another problem with SSL traffic is that a network based intrusion detection system or IDS is unable to analyze the SSL encrypted traffic to detect an attack. Other prior art systems attempt to handle SSL traffic by decrypting the traffic, load balancing and then forwarding the traffic to an SSL device for re-encryption but these embodiments rely on IP forwarding for the sequence processing. While effective, these embodiments also require a much more complex configuration which is undesirable, difficult to implement and maintain. In fact, with such prior art implementation, it is necessary to create a plurality of NAT translations of ports and destination IP addresses to create the traffic flow necessary to decrypt, load balance and then re-encrypt the traffic.

To overcome these disadvantages of the prior art, the present invention efficiently handles SSL traffic while offloading the encryption/decryption process from the servers of a data center. More specifically, a data center provides secure handling of HTTPS traffic using backend SSL decryption and encryption using a load balancer and an SSL offloader. The load balancer detects HTTPS traffic and redirects it to an SSL offloading device for decryption and return to the load balancer. The load balancer then uses the clear text traffic for load balancing purposes before it redirects the traffic back to the SSL offloading device for re-encryption. Thereafter, the re-encrypted traffic is sent to the destination servers in the data center. The present invention sends the decrypted traffic back to the SSL encryption device after having performed the load balancing decision, without having to alter the destination port or other parameters to re-encrypt the traffic. In one embodiment, the combination with the back-end SSL with an intrusion detection system improves security by performing intrusion detection on the decrypted HTTPS traffic.

The present invention provides significant benefit because the load balancer rewrites the destination IP address (as a result of the load balancing decision) and sends traffic back to the SSL offloading device for re-encryption with very a simple configuration on the SSL offloading device. Advantageously, there is no need to maintain a one-to-one mapping of NAT statements on the SSL offloading device. The load balancer may also be configured to rewrite the destination port to a different port to uniquely identifying the traffic sent by the load balancer to the SSL offload device for re-encryption. The foregoing and additional features and advantages of this

DETAILED DESCRIPTION OF EMBODIMENTS OF THE INVENTION

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, parts, and/or the like. In other instances, well-known structures, materials, or operations are not specifically shown or described in detail to avoid obscuring aspects of embodiments of the present invention.

Figure 1:
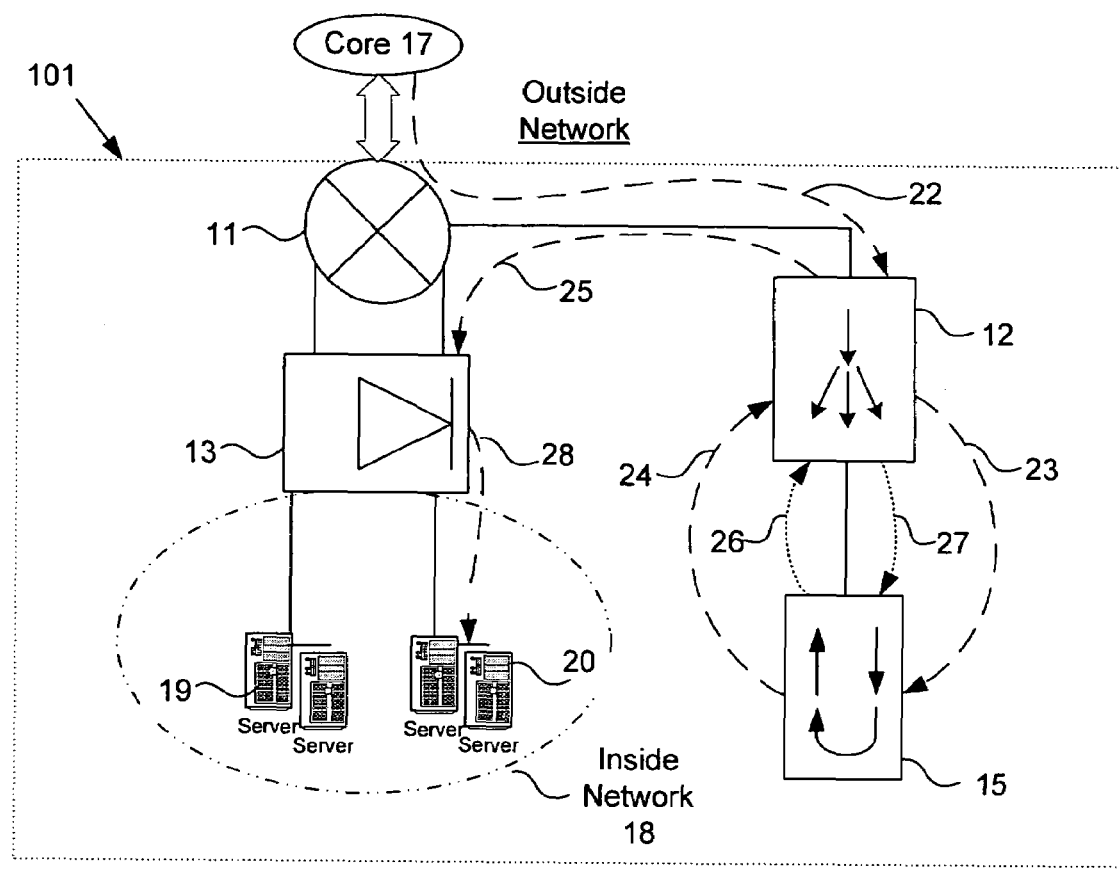
FIG. 1 is a secure one-arm data center adapted for handling HTTPS traffic in accordance with one embodiment of the present invention.

The present invention efficiently handles SSL traffic while off-loading the encryption process from the servers without exposing clear text traffic or decrypted traffic to intruders. A representative data center 101 is illustrated in FIG. 1 with a layer 3 switch or router 11 coupled to a load balancing content switch 12 and firewall 13 configured in a one-arm fashion. A SSL off load device 15 is coupled to content switch 12.

The layer 3 switch or router 11 is a device, or network appliance, that determines the next network point to which information packets, or traffic, should be forwarded toward its destination. Router 11 in one preferred embodiment is either the Cisco Catalyst 6500 or the Cisco 7600 series router, both of which are commercially available from Cisco Systems, the parent corporation of the present assignee. Router 11 is connected to at least two networks, such as, by way of example, an outside core network 17 and an inside network 18. Inside network 18 comprises a plurality of servers such as web servers 19 and application servers 20. In other embodiments, servers 19 or 20 may be database servers, mail servers, file servers, DNS servers or streaming servers by way of example.

Firewall 13 monitors traffic between subnets or from the outside by implementing security schemes that prevent unauthorized users from gaining access to servers 19 or 20. Firewall 13 is preferably stateful firewall configured to provide multiple virtual firewalls within a single hardware service module or appliance. Additional firewalls or firewall instances may be deployed in data center 101 at strategic locations to monitor traffic from the outside network 17.

Content switch 12 is preferably a content switching module such as the CSM commercially available from Cisco Systems, Inc. the parent corporation of the assignee of the present invention. In alternative embodiments, content switch 12 may be a Content Switching Service or CSS device, which is a switch also available from Cisco Systems. In other embodiments, other content based or service based switches could be also be used. The primary purpose of content switch 12 is to implement load balancing policies. These policies describe how connections and requests are to be distributed across the servers in each sub-net eligible to receive the traffic.

In general, content switch 12 accesses information in the TCP and HTTP headers of the packets to determine the complete requested URL and any cookies in the packet. Clear text traffic, such as regular HTTP GETs, is routed to the content switch 12 which distributes the requests to servers 19 or 20, as appropriate, listening on port 80. Router 11 also routes encrypted HTTP traffic to the content switch 12 which, in turn, forwards this encrypted traffic to SSL offload device 15. In order to access this information in encrypted SSL packets, the SSL packets must be decrypted which is the function of SSL offload device 15. Once the SSL packets are decrypted, the traffic is returned to content switch 12 to determine the best server for an inbound request. However, rather than sending clear text to the server, content switch 12 passes the traffic back to SSL offload device 15 for re-encryption in a unique manner. Specifically, the content switch rewrites the IP address to the real server IP address based on the load balancing decision. However, rather than send it on to the server, the content switch rewrites the destination MAC to SSL offload device 15 MAC address and forwards the traffic back to the SSL offload device 15. Once re-encrypted, the traffic is forwarded to router 11 by content switch 12 and then to the designated server through firewall 13. In this manner, content switch 12 provides load balancing on the decrypted traffic but sends encrypted traffic back to router 11 thereby minimizing the risk of exposing traffic to malicious attack.

Because SSL offload device 15 returns decrypted traffic to the content switch 12 for load balancing, session persistence between HTTPS and HTTP is maintained. Thus, when a user logs into a server with a secure connection, the load balancer is able to monitor encrypted headers including any cookies included with the packet and can better manage the session. Further, since the load balancer is provided with decrypted header information, the load balancer is able to identify the user and properly balance secure traffic. Once the SSL re-encrypts the payload, it sends the traffic back to the load balancer for forwarding to the destination.

The dashed lines in FIG. 1 illustrate the traffic path 22-25 for encrypted HTTPS traffic received from outside network 17. Specifically, HTTPS is routed by router 11 to content switch 12 along traffic path 22. Content switch 12 recognizes the traffic is encrypted and forwards it to SSL offload device 15 as indicated by traffic path 23. The SSL offload device 15 decrypts the traffic and sends it back as clear text to content switch 12 for load balancing along traffic path 26. Because this traffic is clear text, content switch 12 can maintain session persistence and load balance web traffic. However, since an intruder could install a tool such as ethercap on a compromised server and capture the clear text traffic, the present invention has the content switch forward the traffic back to the SSL offload device 15 to perform back-end encryption along traffic path 27. Then, after the content switch has selected the best server for the incoming traffic, the traffic is sent back to the SSL offload module with the information about the selected real server. The SSL offload device 15 re-encrypts the traffic and sends it back to the CSM as encrypted traffic along traffic path 24. The CSM then forwards the request to the real server through router 11 and firewall 13 along traffic paths 25 and 28. Advantageously, the traffic is encrypted so even if a hacker has installed a tool on a compromised server there is only encrypted traffic being sent to the server and not clear text traffic.

Figure 2:
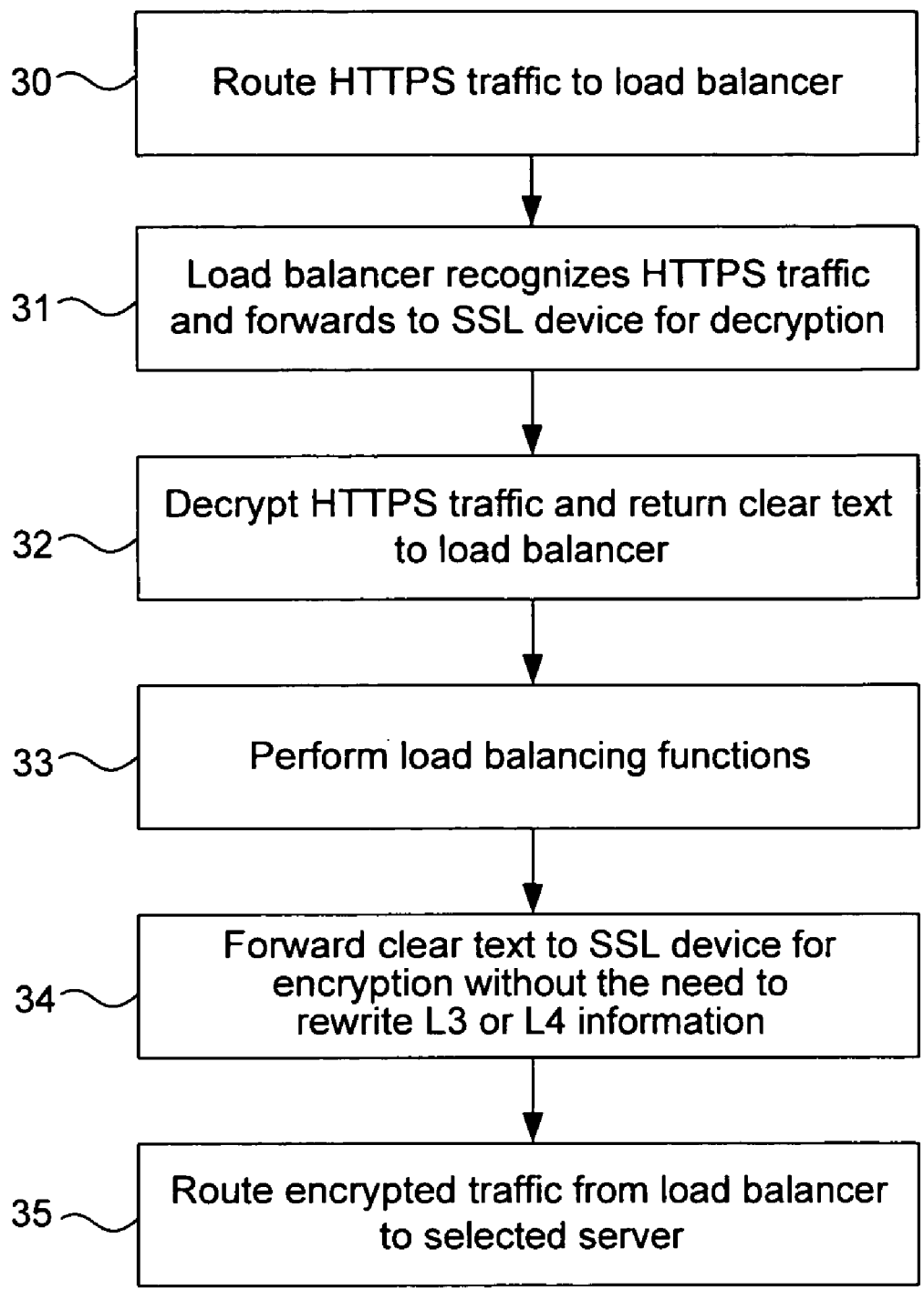
FIG. 2 is a flow diagram illustrating one implementation of the present invention.

Refer now to FIG. 2, where one method for implementing the present invention is described. Specifically, when traffic is received at a data center, it is routed to a content switch that functions to load balance the traffic among servers as indicated at step 30. The content switch recognizes that the traffic is encrypted HTTPS, it forwards the traffic to a backend SSL device as indicated at step 31. The SSL device decrypts the HTTPS traffic and returns clear HTTP traffic to the load balancer as indicated at step 32. Using the clear traffic, the content switch determines the destination server, maintains session persistence between HTTPS and HTTP traffic and performs other load balancing functions as indicated at step 33. Subsequently, the content switch returns the clear traffic to the SSL device to be encrypted as indicated at step 34. Advantageously, there is no need when forwarding clear text to the SSL device for encryption to rewrite the L3 or L4 information. The encrypted traffic is then returned to the content switch to be routed to the destination server as indicated at step 35.

Figure 3:
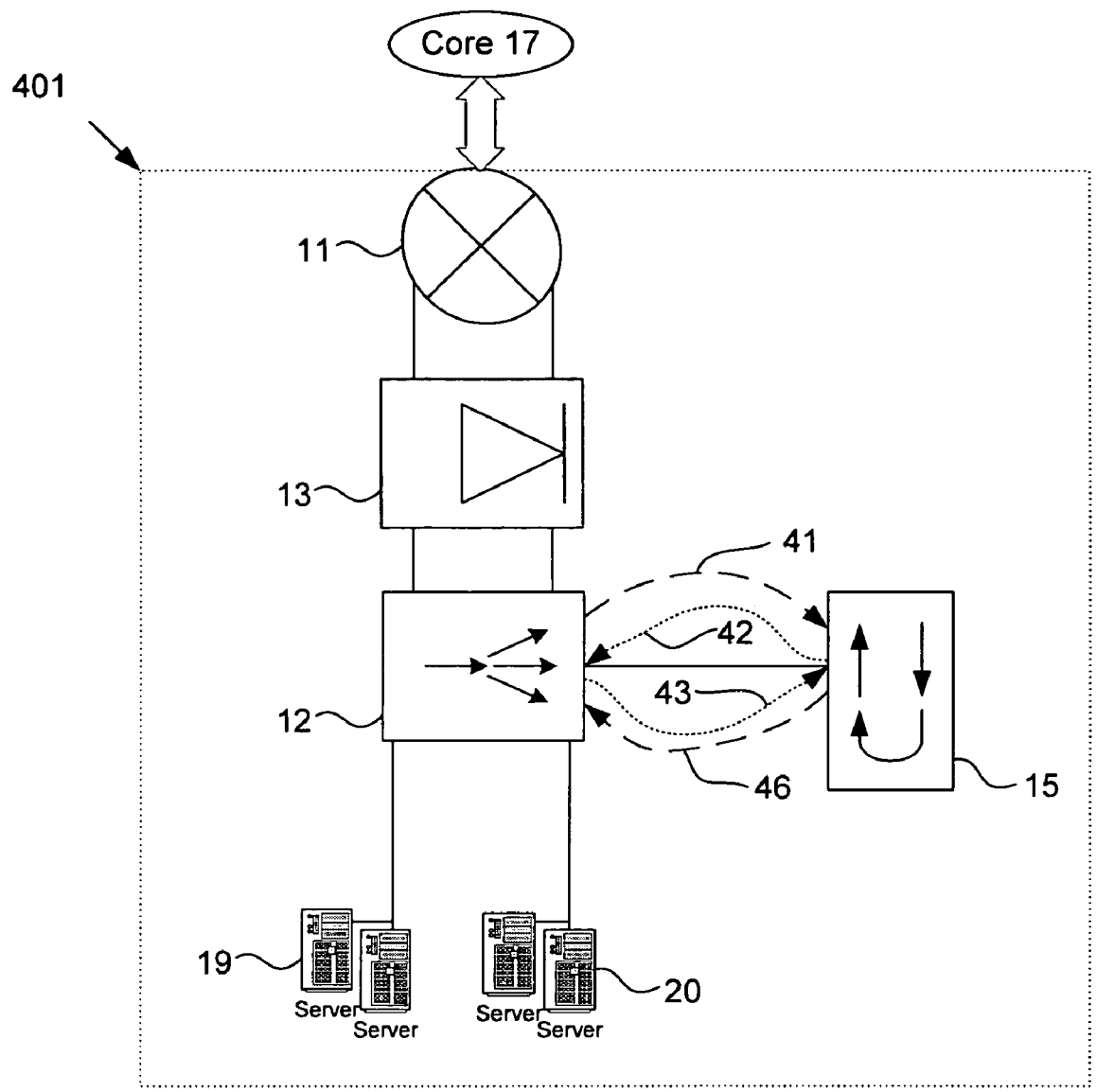
FIG. 3 is a secure inline data center adapted for handling HTTPS traffic in accordance with one embodiment of the present invention.

FIG. 3 illustrates another data center 401 topology which includes router 11, firewall 13 and content switch 12 coupled inline where the content switch 12 operates in the transparent mode which means it bridges any server VLANs with a corresponding client VLAN. In this topology, router 11 performs all of the routing functions between the server VLANs. Thus, if server-to-server traffic from separate subnets, it must flow to the router and back to the content switch from the VLAN interface of the router. Each time HTTPS traffic is received from the router or a subnet, it is first forwarded to SSL offload device 15. Traffic path 41 illustrates the flow of encrypted HTTPS from content switch 12 to SSL offload device 15 where it is decrypted. The clear text is sent back to content switch 12 along traffic path 42 for load balancing. However, before forwarding the traffic to the destination server or client, content switch 12 sends the clear text traffic back to SSL offload device 15 to be encrypted along traffic path 43. SSL offload device returns encrypted traffic having a known destination to content switch 12 for forwarding to the intended destination server along traffic path 46.

Figure 4:
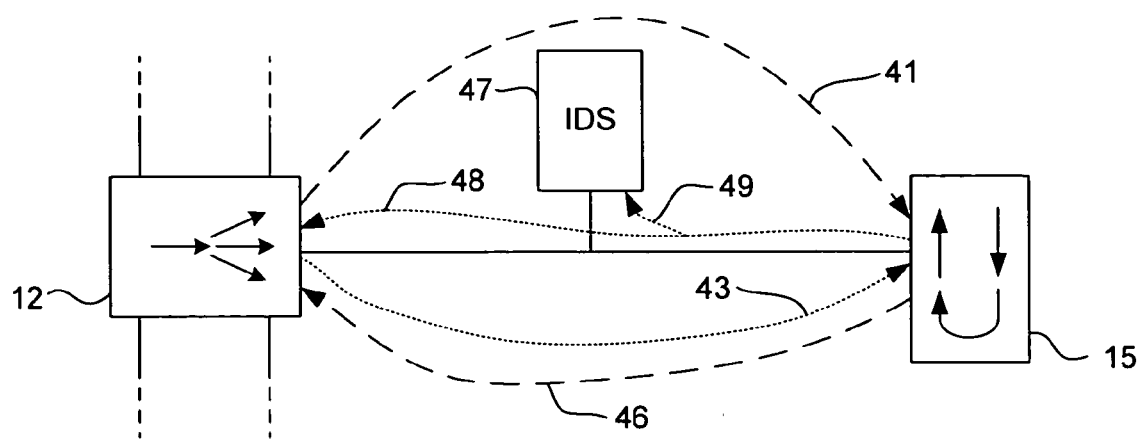
FIG. 4 illustrates another embodiment of a portion of a secure data center in accordance with one embodiment of the present invention.

FIG. 4 illustrates another embodiment showing a portion of data center 401. In this embodiment, an intrusion detection system or IDS 47 is coupled between content switch 12 and SSL offload device 15 in a one-arm fashion. IDS 47 monitors the data center network by analyzing network traffic and looking for signs of malicious or suspicious anomalies that indicate inappropriate or incorrect activity construed as attempts to intrude. The IDS may be a network-based device or a host-based intrusion prevention system implementation configured in an appliance or external device, service module or internal device related to the integrated 13 that provides connectivity to the appliances or hosts the service modules. IDS 47 monitors clear text traffic before it is acted upon by content switch 12. When content switch 12 forwards HTTPS traffic to SSL offload device 15 along traffic path 41, the traffic is decrypted and sent to the CSM 12 along traffic path 48. IDS 47 receives a copy of this traffic on traffic path 49 and implements security policies for data center 401 utilizing sophisticated detection techniques that include stateful pattern recognition, protocol parsing, heuristic detection, and anomaly detection. These detection techniques provide comprehensive protection to filter out malicious traffic or to initiate an action such as IP session logging, TCP resets or by instructing content switch 12 to block the traffic. Once the content switch determines the destination server, maintains session persistence between HTTPS and HTTP traffic and performs other load balancing functions content switch 12 sends the clear text traffic back to SSL offload device 15 along traffic path 43 to be encrypted. SSL offload device returns encrypted traffic having a known destination to content switch 12 for forwarding to the server farm along traffic path 46. Advantageously, content switch 12 may provide load distribution to a number of active SSL offload devices.

The integration of IDS 47 monitors for malicious activities carried in HTTPS. With SSL back-end encryption, the servers are configured with an SSL server certificate and the SSL offload device verifies the signature of the server SSL certificate.

In other embodiments, additional security devices are accessed along paths 48 and 49 to monitor the traffic and increase network security by identifying an attack by a hacker hidden in the encrypted envelop of the traffic. For example, an application firewall can scan for 80/443 port mis-use and ill-formed HTML and XML documents. The addition of a layer 7 firewall enables the detection of malicious data that may be present in the encrypted payload. In yet another embodiment, an XML frond-end processor or an anti-spam processor can scan encrypted XML traffic or encrypted electronic mail for spam or other mal-ware hidden by a hacker in the encrypted payload. It will be apparent to one skilled in the art, that even though not specifically shown, any number of additional security devices can be deployed between the load balancer and the SSL processor to monitor clear text traffic after it has been decrypted by SSL 15. Once the traffic has been scanned by the spam processor or XML firewall or inspected by the firewall, it may be forwarded on to the load balancer to determine the destination and then sent back to SSL 15 for re-encryption.

Figure 5:
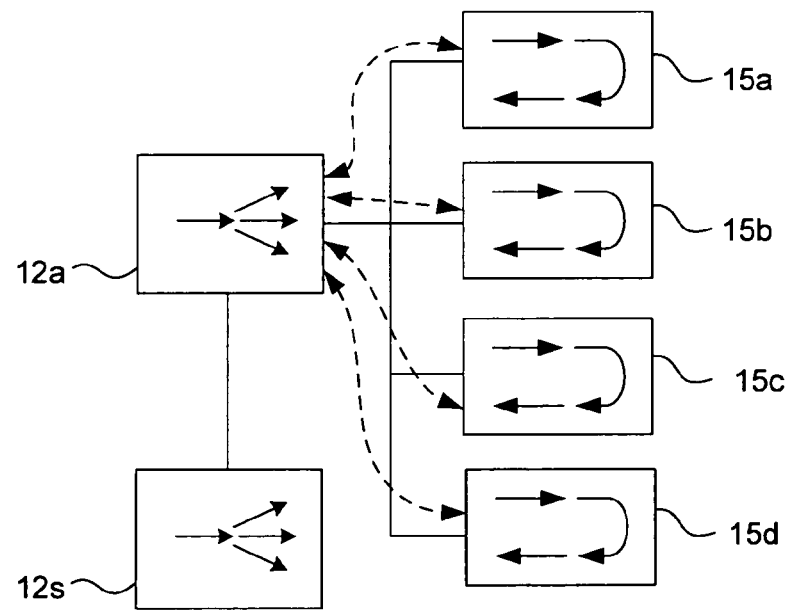
FIG. 5 illustrates another embodiment of a portion of a secure data center having an SSL device farm in accordance with one embodiment of the present invention.

FIG. 5 illustrates another portion of a data center where content switch 12a actively monitors a plurality of SSL offload devices illustrated as 15a-15d in an SSL farm. It is to be understood that the number of SSL offload devices is dependant on the application and a data center may have more than four or fewer than four SSL offload devices. The content switch monitors the health of the SSL offload devices. With a SSL farm, content switch 12a will load balance traffic among healthy SSL offload devices.

When content switch 12a redirects a HTTPS request to one of the SSL offload devices 15a-15d, the SSL traffic is still encrypted, the destination MAC is the MAC address of the selected SSL offload device 15a-15d and the destination IP address is unchanged. Preferably, the content switch preserves the destination IP address by not translating the server's IP address and rewrites only the destination MAC address. Content switch 12s is the standby content switch which backups content switch 12a in the event a failure occurs.

SSL offload devices 15a-15d send the decrypted traffic back to content switch 12a for load balancing. From the SSL offload device 15a-15d to content switch 12a there is no need to rewrite the destination IP address. It is preferred that the destination IP is preserved because it identifies the server pool to which the client needs to send the request. The decrypted traffic can be sent from the SSL offload device to the content switch on any port such as port 80 because the traffic is decrypted HTTP traffic. In other embodiments, it may be beneficial to use a different port from 443 or 80 to indicate that this traffic is specifically HTTPS-decrypted traffic from the SSL offload device to the content switch, for example, port 81. The destination MAC address is the MAC address of the content switch.

Content switch 12a then performs the load balancing operations (that is, determine which servers should receive the traffic) and sends the traffic back to the SSL offload device 15a-15d for encryption before routing it to the destination server. One representative configuration on the content switch for the load balancing decision is shown in Table 1.

TABLE 1

```
module csm 4
    serverfarm WEBAPPSSL
        nat server source-mac
        no nat client
        predictor hash address
        real name REAL1 82
            inservice
        real name REAL2 82
            inservice
        exit
    vserver WEBAPPSSL
        virtual <virtual IP address> tcp 81
        vlan 45
        no inservice
        serverfarm WEBAPPSSL
        inservice
    exit
```

Because content switch 12a is configured to perform address translation or NAT, on the server's IP address, it does not forward the traffic to the real IP addresses. Rather, content switch 12a rewrites the server's IP address to the real IP address and forwards traffic to the SSL offloading device. It is also possible to configure the content switch to rewrite the destination port to a different port than 80 or 81, such as port 82 for uniquely identifying the traffic sent by content switch 12s to the SSL offload devices 15a-15d for reencryption. The content switch 12a also uses the MAC address of a SSL offload device 15 from which the traffic came as a destination MAC, and content switch 12a sends out the load balanced request to the incoming VLAN.

By having the content switch NAT the server IP address, the SSL offload device to is able to receive the traffic for back-end encryption while preserving HTTP/HTTPS persistence because the server farm for port 81 has the same IP addresses as the server farm for port 80. The nat server source-mac option enables the content switch to send clear text traffic back to the SSL device from which the traffic was originally received. The nat server source-mac option also allows enabling content switch 12a to monitor the real servers on port 443.

Once content switch 12 has rewritten the destination IP address to be one of the selected real servers, a SSL offload device 15a receiving traffic needs to re-encrypt the traffic using, by way of example, the back-end encryption configuration shown in Table 2:

TABLE 2

```
ssl-proxy service BACKEND client
    virtual ipaddr 0.0.0.0 0.0.0.0 protocol tcp port 82 secondary
    server ipaddr <content-switch-address> protocol tcp port 443
    no nat server
    trusted-ca SERVERCA
    authenticate verify signature-only
    inservice
!
```

SSL offload device 15a configuration takes any destination IP address and originates an SSL handshake with the selected IP address. In one embodiment, the SSL offload device operates as an SSL client in relation to the servers. A receiving SSL offload device 15a encrypts and forwards the traffic to content switch 12a again (destination MAC is the content switch MAC address). The destination IP address is unchanged as it is the real server IP address. Content switch 12a then simply needs to forward the incoming request to the servers. One representative configuration on the content switch is as follows in Table 3:

TABLE 3

```
vserver FORWARDFROMSSL
    virtual 0.0.0.0 0.0.0.0 tcp 443
    vlan 45
    serverfarm FORWARD
    persistent rebalance
    inservice
!
serverfarm FORWARD
    no nat server
    no nat client
    predictor forward
!
```

The content switch 12 forwards the traffic to the server and the server sends outbound traffic back to the content switch 12. Content switch 12 forwards the traffic to SSL offload device 15 because the connection was initiated by the SSL offload device, and the connection table on the content switch remembers the association of the connection with the VLANs and MAC addresses. SSL offload device 15 decrypts the traffic and sends it back to the content switch, which in turn has connection information stored for the clear text traffic. This allows forwarding of the clear text traffic back to the SSL offload device for encryption before it is routed back to the originator. This decryption, load balancing and encryption cycle continues for the duration of the session.

Figure 6:
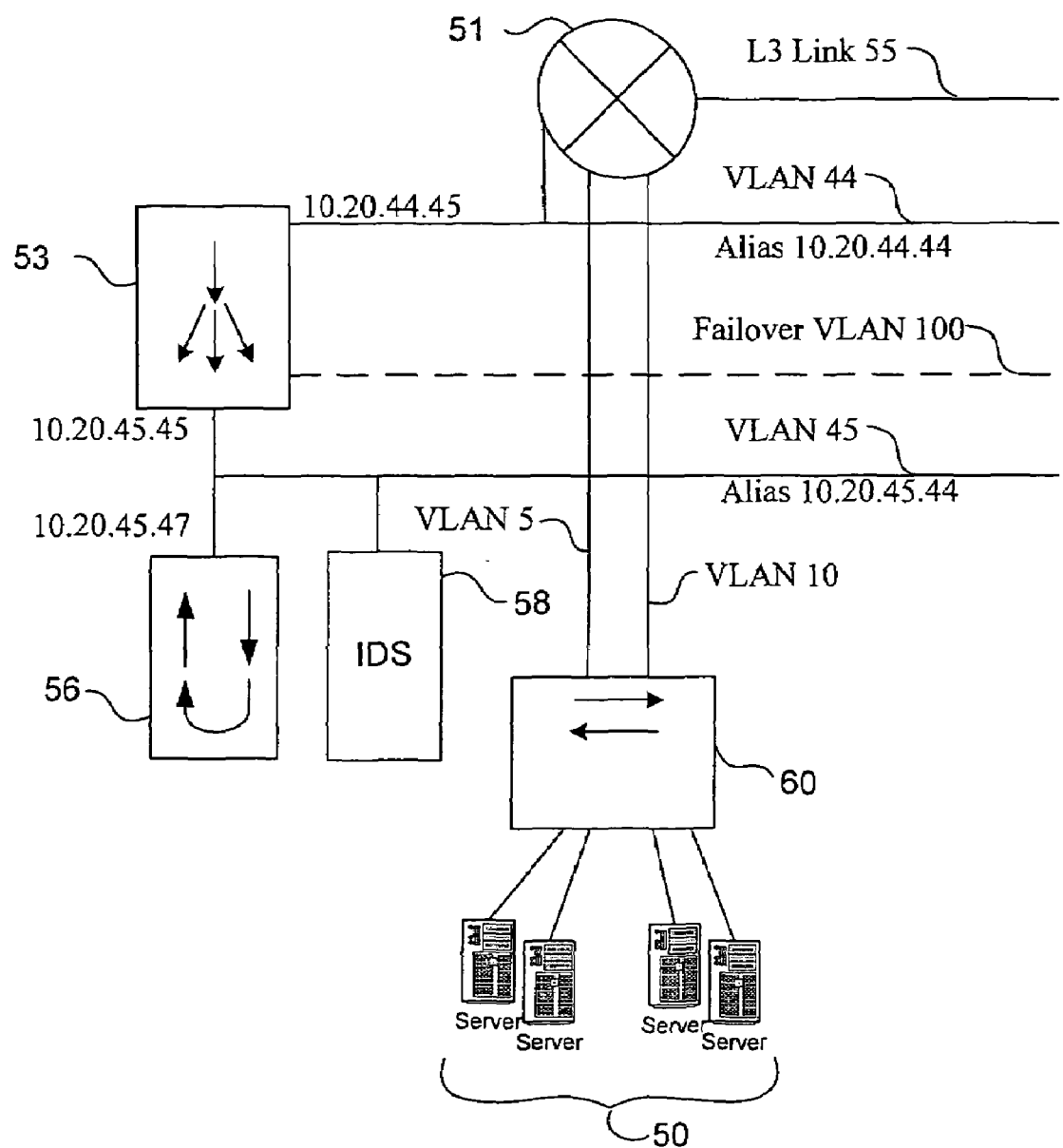
FIG. 6 illustrates another embodiment of a secure one-arm data center adapted for handling HTTPS traffic in accordance with one embodiment of the present invention.

FIG. 6 shows the topology of another embodiment of the present invention. Router 51 routes traffic from the core network to content switch 53 on a VLAN 44, using ip address 10.20.44.45, which is used to only send traffic from the router to the content switch. The virtual IP addresses, or VIPs, belong to this subnet. The servers IP address also belong to the same 10.20.5.x subnet.

When a VIP is configured for a set of servers 50, router 51 intercepts traffic and redirects it to content switch 53 on VLAN 44 using Route Health Injection. RHI allows the content switch to advertise the availability of a VIP address and multiple content switch devices with identical VIP addresses and services can exist throughout the network.

SSL offload device 56 resides on a 10.20.45.x subnet, and its default gateway is the content switch 53 (alias) IP address. The SSL offload device 56 IP address is illustrated as 10.20.45.47. For example, content switch 53 may intercept port 443 traffic destined to a VIP address and send it to the appropriate SSL offload device 56 for decryption on VLAN 45.

IDSs 58 is also coupled to VLAN 45. It is well understood that when an intruder uses HTTPS, an IDS cannot see, for example, if a client is creating a reverse shell with a web/app server by exploiting well-known vulnerabilities. One of the major benefits of the use of SSL and IDS in combination is the fact that the IDS can detect malicious activities otherwise hidden by HTTPS. The IDS sensor must monitor VLAN 45 used for the communication between the content switch and the SSL offload device. It should be understood that copying SSL-encrypted traffic to the IDS sensor would serve no purpose and should be avoided. The topology shown in FIG. 6 enables back-end encryption while detecting malicious activity embedded in HTTPS code.

In one preferred embodiment, the Hot Standby Routing Protocol (HSRP) is used to provide automatic router backup when configured on Cisco routers that run Internet Protocol (IP) over Ethernet, Fiber Distributed Data Interface (FDDI) or Token Ring local-area networks (LANs). HSRP allows one router to automatically assume the function of a second router if the second router fails. HSRP allows users on one subnet continuous access to resources in the network. HSRP can be used with any routing protocol supported by the router. Servers 50 belong either to VLAN 5 or VLAN 10 and the servers' default gateway is the HSRP address for router 51. These VLANs are trunked to the layer 3 switch 51 from access switch 60.

Layer 3 switch or router 51 is connected to server farm 50 by a switch 60. The topology illustrated in FIG. 6 is well suited for active-standby data center or active-active data center topologies that require the security of encrypted traffic, it being understood that a mirror image of the data center illustrated in FIG. 6 may be provided for the active-standby and active-active topologies.

Table 4 illustrates one configuration that uses VACL capture on VLAN 45 to copy the traffic to IDS 58:

TABLE 4

!
ip access-list extended decrypted
permit tcp any any eq 81
permit tcp any eq 81 any
!
ip access-list extended IP-catch-all
permit ip any any
!
vlan access-map decrypted 10
match ip address decrypted
action forward capture
vlan access-map decrypted 20
match ip address IP-catch-all
action forward
!
vlan filter decrypted vlan-list 45
!
interface FastEthernet8/27
switchport
switchport capture
switchport capture allowed vlan 45
no shut
!
exit If it is desired to only monitor clear text traffic on VLAN 45, for example, the communication with the VIP address, the ACL in the configuration of Table 5 needs to be modified as shown in Table 5:

TABLE 5 ip access-list extended decrypted
permit tcp any 10.20.5.80 255.255.255.255 eq 81
permit tcp 10.20.5.80 255.255.255.255 eq 81 any
!

The access control list or ACL needs to be changed every time a new virtual server is added. If the system is configured for port translation with, for example, port 81 used to identify decrypted traffic using the VIP address and port 82 used to identify decrypted traffic after the load balancing decision, the ACL can be simplified as shown in Table 6:

TABLE 6 ip access-list extended decrypted
permit tcp any any eq 81
permit tcp any eq 81 any
!

Data centers are vulnerable to intrusion attacks aimed at stealing confidential information. Applications are typically deployed in multiple tiers or subnets that are vulnerable to attack if clear traffic is passed between subnets. Intruders exploit server vulnerabilities to obtain a shell on the web/application server and to install software that runs unwanted functions (such as Trojan horses) on the target host. At this point, the attacker controls the web/application server in the data center. An intruder can compromise a server, install a traffic monitoring device, and then wait for users to be assigned to the compromised server. This gives the intruder visibility into only the transactions handled by the compromised server. Further, an intruder can compromise one machine and control all transactions going to the adjacent Layer 2 network. If these transactions are exchanged in clear text, the hacker can collect confidential information that travels unencrypted in the adjacent Layer 2 segment. The solution is to use network-based SSL with SSL back-end encryption. By using SSL back-end encryption, the SSL offload device re-encrypts traffic before sending it to the destination server so no transactions are in clear text. Using backend SSL to protect confidential data greatly reduces the effectiveness of methods used by hackers.

Recognizing that the present configuration of the present invention places a heavy load on each server within a network responsible for decrypting traffic. To minimize the overhead associated with establishing a connection from the SSL proxy and servers 58, it is preferred that the SSL maintain a connection even after a user has terminated their session. Thus, the connection may be used for subsequent users but without the overhead associated with establishing a new connection. This connection is maintained by specifying a persistent connection in the connection header such that the connection is maintained indefinitely and is only torn down by the server when required by data center policy. This technique minimizes both the SSL and TCP handshake required to set up a connection with one of servers 58.

In one preferred embodiment, when SSL 56 allocates an SSL server connection for servicing a client's request, it initially looks to a cache to determine if any active connections had been previously cached. If there are any such connections, it binds the client connection with the cached server connection and starts the data transfer. If there are no cached connections, SSL 56 checks if there is any active session that was cached under the server 58. If yes, SSL 56 opens a new SSL connection and uses the cached session state to execute a short-handshake exchange with the server. If there are no cached connection and no cached session for a given server, SSL 56 opens a new SSL connection and executes a full-handshake exchange with the server.

Accordingly, the present invention provides a new data center topology that uses backend encryption to make data centers more secure. The present invention utilizes a content switch that passes encrypted traffic to a SSL offload device to generate clear traffic for load balancing purposes and after the load balancer determines the correct server, the traffic is encrypted before being sent to the appropriate server. A further enhancement includes an IDS to monitor the clear traffic during the load balancing operation before it the traffic is re-encrypted. Accordingly, the present invention provides a data center having a secure and scalable topology.

Although the invention has been described with respect to specific embodiments thereof, these embodiments are merely illustrative, and not restrictive of the invention. For example, the network may include different routers, switches, servers and other components or devices that are common in such networks. Further, these components may comprise software algorithms that implement connectivity functions between the network device and other devices in a manner different from that described herein.

In the description herein, specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

As used herein the various databases, application software or network tools may reside in one or more server computers and more particularly, in the memory of such server computers. As used herein, "memory" for purposes of embodiments of the present invention may be any medium that can contain, store, communicate, propagate, or transport the program for use by or in connection with the instruction execution system, apparatus, system or device. The memory can be, by way of example only but not by limitation, an electronic, magnetic, optical, electromagnetic, infrared, or semiconductor system, apparatus, system, device, propagation medium, or computer memory.

Reference throughout this specification to "HTTPS" includes other forms of SSL encrypted traffic including LDAP, mail, POP over SSL and others. The embodiments described above are readily adapted to handle other types of SSL encrypted traffic.

Reference throughout this specification to "one embodiment," "an embodiment," or "a specific embodiment" means that a particular feature, structure, or characteristic described in connection with the embodiment is included in at least one embodiment of the present invention and not necessarily in all embodiments. Thus, respective appearances of the phrases "in one embodiment," "in an embodiment," or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method comprising:

receiving SSL encrypted traffic;

transferring said SSL encrypted traffic to an SSL offload device:

receiving from said SSL offload device clear text traffic that has been generated by decrypting the SSL encrypted traffic;

determining a load balancing decision to determine a destination server from a plurality of servers for the clear text traffic;

rewriting, by a network device, said clear text traffic with a real server address for the determined destination server determined by the load balancing decision;

rewriting, by the network device, a destination MAC address to a MAC address for the SSL offload device;

after the rewriting steps, forwarding said clear text traffic to said SSL offload device for re-encryption using the destination MAC address, wherein the real server address is preserved in the clear traffic; and after the SSL offload device re-encrypts the clear text traffic that includes the real server address, routing said encrypted traffic to said destination server using the real server address.

2. The method of claim 1 further comprising transferring said clear text traffic to an intrusion detection system prior to said routing step.

3. The method of claim 1 wherein said receiving step further comprises the step of receiving HTTPS traffic from a client.

4. The method of claim 1 further comprising the step of protecting a data center from intruders by transferring traffic between subnets as HTTPS traffic.

5. The method of claim 1 wherein said traffic is encrypted using Secure Socket Layer (SSL) encryption.

6. The method of claim 1 wherein a signature of the certificate from said destination server SSL certificate is verified during the encryption.

7. The apparatus of claim 1 wherein a signature of the certificate from said destination server SSL certificate is verified during the encryption.

8. The method of claim 1, wherein preserving the real server address allows preserving of HTTP and HTTPS persistence because the real server address is forwarded to the offload device in the clear traffic and received from the offload device as encrypted traffic.

9. The method of claim 1, wherein the encrypted traffic is sent through a different port from the clear text traffic.

10. A method comprising:

receiving SSL encrypted traffic from a load balancer;

performing, by a network device, network based decryption on said SSL encrypted traffic to obtain clear text traffic;

forwarding, by the network device, said clear text traffic to said load balancer, wherein the clear traffic allows the load balancer to determine a load balancing decision to determine a destination server from a plurality of servers for the clear text traffic, wherein said clear text traffic is rewritten with IP address for the destination server, and wherein the clear traffic is rewritten from a destination MAC address a MAC address for the network device;

after the load balancer performs rewriting operations, receiving from said load balancer, using the destination MAC address, clear text traffic that has been modified to specify the destination server from the plurality of servers; and performing re-encryption of said modified clear text traffic, wherein the IP address is preserved in the clear traffic; and sending the encrypted modified clear traffic to the load balancer to allow the load balancer to send the encrypted modified clear traffic to the destination server using the IP address.

11. The method of claim 10 further comprising distributing the SSL decryption and encryption the load among a plurality of SSL devices.

12. The method of claim 10 further comprising the step of monitoring said clear text traffic with a security device.

13. The method of claim 12 wherein said at least one security device includes an intrusion detection system, a layer 7 firewall, an email spam processor or an XML firewall.

14. The method of claim 10 further comprising forwarding the traffic after re-encryption to said load balancer such that said IP address remains unchanged.

15. The method of claim 10 where said network device is configured to establish an SSL handshake with the IP address selected by said load balancer.

16. The method of claim 14 wherein said IP address is a real server IP address.

17. The apparatus of claim 10 wherein the logic when executed is further executable to distribute the SSL decryption and encryption the load among a plurality of SSL devices.

18. An apparatus comprising:

one or more computer processors; and logic encoded in one or more computer readable storage media for execution by the one or more computer processors and when executed executable to:

receive SSL encrypted traffic;

transfer said SSL encrypted traffic to an SSL offload device;

receive from said SSL offload device clear text traffic that has been generated by decrypting the SSL encrypted traffic;

determine a load balancing decision to determine a destination server from a plurality of servers for the clear text traffic;

rewrite said clear text traffic with a real server address for the determined destination server determined by the load balancing decision;

rewrite a destination MAC address to a MAC address for the SSL offload device;

after the rewriting steps, forward said clear text traffic to said SSL offload device for re-encryption using the destination MAC address, wherein the real server address is preserved in the clear traffic; and after the SSL offload device re-encrypts the clear text traffic that includes the real server address, route said encrypted traffic to said destination server using the real server address.

19. The apparatus of claim 18 wherein the logic when executed is further executable to transfer said clear text traffic to an intrusion detection system prior to said routing step.

20. The apparatus of claim 18 wherein logic executable to receive further comprises logic executable to receive HTTPS traffic from a client.

21. The apparatus of claim 18 wherein the logic when executed is further executable to protect a data center from intruders by transferring traffic between subnets as HTTPS traffic.

22. The apparatus of claim 18 wherein said traffic is encrypted using Secure Socket Layer (SSL) encryption.

23. An apparatus comprising:

one or more computer processors; and logic encoded in one or more computer readable storage media for execution by the one or more computer processors and when executed executable to:

receive SSL encrypted traffic from a load balancer;

perform network based decryption on said SSL encrypted traffic to obtain clear text traffic;

forward said clear text traffic to said load balancer, wherein the clear traffic allows the load balancer to determine a load balancing decision to determine a destination server from a plurality of servers for the clear text traffic, wherein said clear text traffic is rewritten with a real server address for the destination server, and wherein the clear traffic is rewritten from a destination MAC address a MAC address for the network device;

after the load balancer performs rewriting operations, receive from said load balancer, using the destination MAC address, clear text traffic that has been modified to specify the destination server from the plurality of servers; and perform re-encryption of said modified clear text traffic; and send the encrypted modified clear traffic to the load balancer to allow the load balancer to send the encrypted modified clear traffic to the destination server using the real server address.

* * * * *

UNITED STATES PATENT AND TRADEMARK OFFICE
CERTIFICATE OF CORRECTION

PATENT NO. : 7,657,940 B2 Page 1 of 1
APPLICATION NO. : 11/124003
DATED : February 2, 2010
INVENTOR(S) : Portolani et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1121 days.

Signed and Sealed this

Twenty-eighth Day of December, 2010

David J. Kappos
*Director of the United States Patent and Trademark Office*